March 2, 1954  G. O. A. KELLOGG  2,670,730
SURGICAL INSTRUMENT FOR OPERATIVE
AND DIAGNOSTIC PURPOSES
Filed Nov. 14, 1952

BILE DUCT

George O. A. Kellogg
INVENTOR.

BY
Attorneys

Patented Mar. 2, 1954

2,670,730

UNITED STATES PATENT OFFICE 2,670,730

SURGICAL INSTRUMENT FOR OPERATIVE
AND DIAGNOSTIC PURPOSES

George O. A. Kellogg, Nampa, Idaho

Application November 14, 1952, Serial No. 320,480

9 Claims. (Cl. 128—2)

This invention relates to surgical instruments to be used by the surgeon for operative and diagnostic purposes and it has for its main object to provide an instrument for exploring vasiform ducts or vessels of the human body and for establishing a communication with the interior of the same while limiting the damage incidental to such exploration. While it is a general purpose of the invention to provide an instrument for use in connection with any vasiform duct in the human body it is a more specific purpose of the invention to provide an instrument to be used in connection with bile duct surgery, either for the exploration of the bile duct or for the introduction or removal of fluids or for measurements in connection with pathological conditions in other organs. It is therefore a main object of the invention to provide an instrument permitting access to the interior of the bile duct without causing a permanent damage to the same which instrument includes a needle probe permitting to obtain cholangiography, to obtain manometric pressure measurements, to apply drugs or local anesthetics through the needle to irrigate the bile duct, to aspirate samples of fluids from the bile duct or from the adjoining portion of the duodenum and to provide a device which in addition permits a manual exploration with a needle point and also the removal of gall stones from the duct.

In order to explain the function of the instrument and its value in connection with surgical operations it may be mentioned that clinical data supplemented by the usual manual findings are extremely unsatisfactory in most cases and said manual exploration of the bile duct during surgery consisting in opening the bile duct and in exploring the interior with a metal probe or with a rubber catheter invariably damages the duct system permanently and such an exploration is therefore only applicable where pathological conditions of the duct system justify such a procedure.

As cholangiography alone does not provide a sufficiently clear picture it must be supplemented by other means such as fluoroscopy which however cannot be used on an operating table. It has therefore been proposed recently to use manometric pressure recordings. However such recordings with means now existing are only possible in the case of a removal of the gall bladder. Nevertheless it was found that excellent diagnostic results were obtained in such a case.

The instrument according to the invention was developed in the first place to permit the recording of manometric pressure curves and the taking of samples of the bile fluid or of the fluid of the duodenum, but it soon proved to be of great help in all cases in which the introduction of a fluid or the aspiration of a fluid proved to be of advantage. This is for instance the case in connection with cholangiography, where a shading substance is introduced or in connection with the direct and complete control of the closing sphincter of the duct (called the sphincter of Oddi) which had to be controlled, according to the means now available, indirectly from the outside and those applications which have been enumerated above. The exploration of the bile duct without any permanent damage and the fact that the damage which may be caused by the instrument will promptly and completely heal makes it possible to explore the bile duct also when not in any pathological condition in the event of surgery, whenever the upper abdomen is opened. This exploration, in many cases settles very important questions or provides clues which are highly valuable for the surgeon or other medical advisor so that a temporary small injury to the bile duct which is inflicted by the use of the instrument may be regarded as a minor disadvantage.

The main problem in connection with the exploration of the bile duct and the making of a connection with its interior consists in providing an instrument which, even in the hands of a less experienced surgeon, limits the damage essentially to a local perforation or to slight damage to the muscular wall of the duct but which avoids longitudinal cuts and other injuries which must be closed by suture or which in other ways produce a permanent malfunction.

The instrument according to this invention will be best described with reference to the accompanying drawing. While the instrument shown in the drawing has been designed in connection with bile duct surgery, it is to be understood that the mechanical problems which have been solved by the instrument are obviously not solely connected with this particular purpose or localization but are mainly connected with the vasiform shape of the organ and the circulation of a body fluid through it. The instrument is therefore clearly adapted for other medical purposes. Moreover the specific design shown is variable to a certain degree although some of its features are indispensable. A departure from the design which has been illustrated is therefore not necessarily a departure from the principle of the invention which will be hereinafter explained together with the best mode of applying the principle in the case of bile duct surgery.

Figure 1:
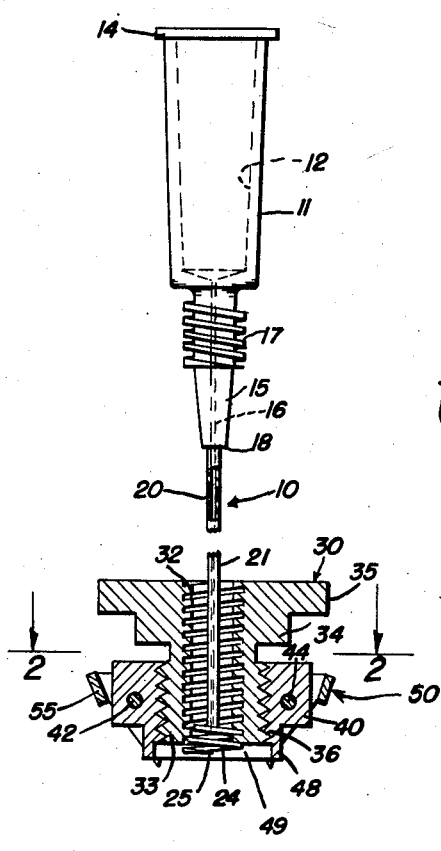
Figure 1 is an elevational sectional view of the instrument according to the invention, the section being taken along one of the planes of symmetry.

The instrument comprises a hollow needle probe of special construction generally indicated at 10 which is provided at its outer end with a fitting 11 which is tapered and has the customary tapered cavity receiving the standard surgical syringe head (not shown). The fitting and the outer end is provided with a square collar 14 for preventing a rolling movement on an inclined plane.

The fitting 11 has an extension 15 through which the duct or channel 16 passes. On the outside the extension 15 is provided with screw threads 17 for a purpose to be described.

A middle portion 21 of the hollow needle probe is welded or swaged to the end of the extension 15 in such a manner that its central bore 20 is aligned and communicates with the channel 16 of the extension 15 and forms a continuation thereof. This middle portion 21 of the needle probe serves as a stem by means of which a certain pressure may be exerted on the tip during a certain probing operation made in some cases by the surgeon.

The tip portion 24 of the needle probe is coiled and has some helical turns and this coil portion ends in a pointed tip 25 by means of which the bile duct may be pierced. The coil portion of the needle probe has only a few turns which are normally collapsed so that the turns of the coil are very close to each other. However, these coil turns may be spread by inserting the tip portion into an inserter 30 which is provided with a bore having internal helical screw threads 32 adapted to engage the coil portion of the needle probe. The screw threads 32 may also cooperate with the screw threads 17 on the extension 15 so that the inserter 30 may be attached to the fitting end of the needle probe during certain operational phases, described below, and for storage and other purposes.

The inserter has a cylindrical body 33 provided with an upper stepped portion 34 with a knurled flange 35 which permits rotation of the inserter 30. On the outside of the cylindrical body screw threads 36 are provided which are preferably cut in the direction opposite to the direction in which the screw threads 32 of the central bore have been cut.

The outer screw threads 36 engage corresponding internal screw threads of a prismatic inserter block 40 which serves as a guide for the advance of the inserter 30.

The inserter block 40 carries pivoted prick members 50 which are attached to the inserter block by means of pivot pins 42, 44. In the side walls of the inserter block a step or shoulder 43 is provided on both sides of a central portion 45 which thus somewhat projects outwardly beyond the lateral portions of the side walls which are recessed. In these lateral portions the side plates of the prick members are held in such a manner that they are flush with the central portions 45.

The inserter block moreover has a cylindrical projection 48 surrounding a shallow cavity 49 which permits to advance the needle probe beyond the under face of the inserter so that the tip of the needle probe may project from the inserter without however protruding from the assembly.

Each prick member 50 consists of a pair of tooth like pointed triangular pricks projecting from a side wall or body portion 52 which is provided with an eye or hole 54 through which the pivot pin 42 or 44 respectively passes. The two side walls and triangular pricks of a prick member are parallel and face each other, the eyes 54 being aligned in order to take up the pivot pin. The two side walls are joined by means of a transverse skirt 55 arranged at right angles to the side wall or body portions 52.

Figure 2:
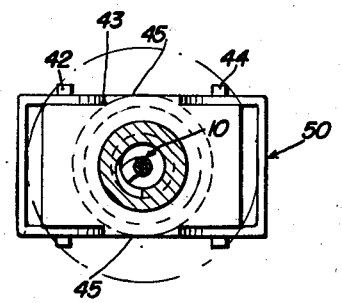
Figure 2 is a sectional plan view, the section being taken along line 2—2 of Figure 1.
Figure 5:
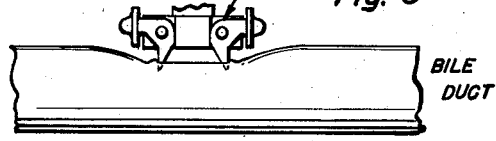
Figure 5 is an elevational diagrammatic view showing the function of the instrument when seated.
Figure 4:
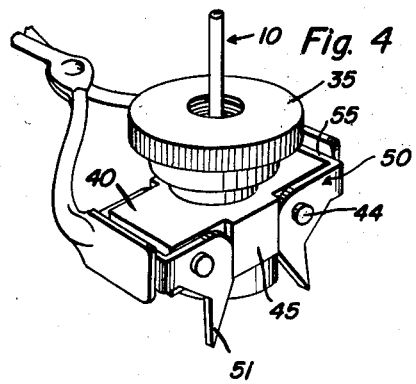
Figure 4 is a perspective view of part of the instrument when in action.
Figure 3:
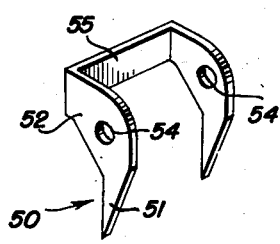
Figure 3 is a perspective view of a prick member used in connection with the invention.

When the prick members are mounted on their pivots in the inserter block 40, as seen in Figures 1 and 2, the transverse skirt 55 projects laterally from the inserter block and is inclined with respect to the side walls of the said block. The skirts 55 on both sides of the inserter block may be seized by the prongs of a forceps and may be pressed against the inserter block thus moving the pricks outwardly. The pricks thus perform only a rocking or oscillating movement. The side wall or body portion of the pricks and the pricks themselves therefore embrace the lateral recessed portion of the inserter block 40 on each side.

The entire instrument and especially the needle probe 10 is made of suitable non-corrosive material. The needle may be given a soft temper to allow the surgeon to bend it in the way he thinks fit in order to suit his particular technique.

The function and operation of the instrument may be best explained with reference to Figures 1 and 2 which shows the instrument when it is ready for insertion.

During a following probing phase, described below, the inserter 30 is screwed onto the screw threads 17 of the extension 15 and the needle probe may then be used for probing.

The coil spring 24 on the tip of the needle probe is normally collapsed with the turns of the coil in such a position that they are very close to each other. When the instrument is used for injecting a fluid into or for aspirating a fluid from the bile duct and the needle probe has therefore to be used for perforating one wall of the bile duct, the turns of the coils have first to be spread by the inserter, preparatory to the insertion and perforation of the wall by the needle tip. The inserter thus assures a perfect penetration of the needle point through the duct wall and relieves the needle of the high torsional stresses which occur during incision. Moreover, the needle advance is perfectly regulated by the pitch of the threads.

The function of the inserter block is twofold. It provides a member fixed on the bile duct which serves as a base for regulating all movements relatively to the ducts and it provides means, such as the pricks, to engage the muscular wall of the duct and to distend it holding a portion of it in a flattened state while the duct has a somewhat flat, drum-like shape which permits to make a small clean hole, and which enlarges the space which is available within the duct, although pressure is applied to it. The set up also prevents the piercing and the emergence of the needle on the other side of the duct even in the event that the instrument should be handled by an inexperienced surgeon. In such a case, without the instrument, piercing of the duct and the emergence of the needle on the other side would occur, if there were not a special means provided to guarantee against such an occurrence.

The operation with the help of the instrument proceeds as follows:

The instrument is first brought into readiness for operation which is the position shown in Figure 1 in which the coils of the needle probe have been threaded into the internal threads 32 of the inserter 30. The instrument, when the surgical operation has proceeded to the point at which the instrument is usable and at which the bile duct is exposed, is grasped and is held ready for use at the end fitting. Then the inserter block 40 is seized and is pressed over the bile duct with a longitudinal axis, marked B—B in Figure 1, parallel to the bile duct.

This pressure flattens the bile duct against the bottom face of the inserter block 40. Now, while the inserter block is still pressed against the bile duct (it may, for instance, be held by a forceps engaging the two faces 45) a forceps grasps the inserter block 40 being applied against the skirts 55 and forcing them against the inserter block thus advancing the pricks 50. The prick members pick and seize the muscular wall of the duct. Even if they should penetrate the wall this would not be material as an oblique penetration does not make a hole as a rule, and even a needle hole in an oblique direction does not leak bile and heals within a short time without affecting the continuity of the duct. After the instrument has thus been secured to the bile duct, it is now essentially controlled by the forceps holding it at the base and applied against the skirts 55.

It will be clear from the above explanation however, that the bile duct, while somewhat flattened, is kept distended much like a flattened drum.

The knurled flange 35 of the inserter 30 is now rotated causing it to advance axially relatively to the inserter block 40. The tip 25 of the needle probe penetrates the duct wall and further rotation brings the duct wall between the needle probe and the lower plane surface of the inserter 30. Now the needle probe is rotated to complete the insertion. The incisor tip 25 collapses after introduction into the bile duct and thus assures safety even when in relatively inexperienced hands. The inserter and the inserter block are now raised and screwed onto the threaded portion 17 of the extension 12.

After the desired function of the needle probe—which may consist in withdrawing bile fluid or fluid from the duodenum, or in measuring the pressure, or in injecting an irrigation fluid, or in introducing drugs to act on the sphincter, or in probing for gall stones and in advancing them etc.—has been fulfilled the needle probe is withdrawn in the manner in which a corkscrew is withdrawn by rotating it.

The inserter block 40, as will be readily understood, in addition to the function described, secures also a precise location of the incision which is fundamental to minimize an incidental damage to the duct.

The inserter, in addition to the functions which have been above mentioned, sets the needle point at the desired point ready for operation thus rendering the surgeon's work more easy and it also transmits the force which is required for the incision.

It will thus be seen that the instrument, as described, provides a completely new aid for bile duct surgery which permits to obtain results hitherto unobtainable. As far as applicant's knowledge goes no instrument has been available or has been used for making the probing of vasiform ducts or vessels of the human body more safe or for making measurements in which it is necessary to produce a connection between the interior of the duct or vessel in the instrument, or in which the fluid within the said duct or vessel is withdrawn or in which a fluid is introduced.

The instrument thus provides an aid for surgery which tends to exclude accidents due to unforeseen complications or to less skilful handling and it therefore acts as a safety appliance which is much needed in this particular field.

It will be clear that minor and unessential changes may be made, without in any way departing from the essence of the invention as defined in the annexed claims.

What is claimed as new is as follows:

1. A surgical instrument for use in connection with vasiform fluid filled organs of the human body comprising a hollow needle probe with a stem portion and a helically wound end portion ending in a pointed needle tip, an inserter for guiding the helical end portion, an inserter block provided with prick members adapted to engage the vasiform organ and to hold it in a distended condition, and means for producing a finely regulated relative axial movement of said inserter and inserter block, and inserter and needle probe.

2. A surgical instrument for use in connection with vasiform fluid filled organs of the human body comprising a hollow needle probe with a stem portion and a helically wound end portion ending in a pointed needle tip, an inserter provided with a bore and with helical threads in said bore, adapted to engage the helically wound end portion of the needle probe, an inserter block provided with prick members adapted to engage the vasiform organ and to hold it in a distended condition, and means for producing a finely regulated relative axial movement of said inserter and inserter block, and inserter and needle probe.

3. A surgical instrument for use in connection with vasiform fluid filled organs of the human body comprising a hollow needle probe with a stem portion and a helically wound end portion ending in a pointed needle tip, an inserter provided with a bore and with helical threads in said bore, adapted to engage the helically wound end portion of the needle probe, and further provided with outer threads and with means for manually rotating said inserter, an inserter block provided with prick members adapted to engage the vasiform organ and to hold it in a distended condition, said inserter block being provided with internal threads adapted to engage the outer threads of the inserter.

4. A surgical instrument for use in connection with vasiform fluid filled organs of the human body comprising a hollow needle probe with a stem portion and a helically wound end portion ending in a pointed needle tip, an inserter for guiding the helical end portion, an inserter block provided with movable prick members adapted to oscillate around a pivot, each of said prick members having a skirt member projecting outwardly and adapted to be moved manually, thus rocking the prick member and means for producing a finely regulated relative axial movement of said inserter and inserter block, and inserter and needle probe.

5. A surgical instrument for use in connection with vasiform fluid filled organs of the human body comprising a hollow needle probe with a stem portion and a helically wound end portion ending in a pointed needle tip, said helical end portion being axially expansible and collapsible, an inserter for guiding and axially expanding the helical end portion, provided with internal threads engaging the helical end portion of the needle probe, so spaced that the turns of the helical portions are spaced and axially expanded while threaded into and held by the said thread, but collapsing again after emerging from the threads, an inserter block provided with prick members adapted to engage the vasiform organ and to hold it in a distended condition, and means for producing a finely regulated relative axial movement of said inserter and inserter block.

6. A surgical instrument as claimed in claim 5, wherein the needle probe is provided at its upper end with a head fitting, adapted to be fitted into a surgical syringe, said fitting being provided with outer threads, adapted to engage the internal threads of the inserter.

7. A surgical instrument as claimed in claim 5, wherein the inserter is provided with a knurled flange, and wherein the means for producing a regulated relative axial movement of the inserter relatively to the inserter block include outer screw threads on the inserter and internal threads on the inserter block, the rotation of the inserter by means of the knurled flange thus producing the said axial relative movement.

8. A surgical instrument for use in connection with vasiform fluid filled organs of the human body comprising a hollow needle probe with a stem portion and a helically wound end portion extending in a pointed needle tip, said helical end portion being axially expansible and collapsible, an inserter for guiding and axially expanding the helical end portion, provided with internal threads engaging the helical end portion of the needle probe, so spaced that the turns of the helical portions are spaced and axially expanded while threaded into and held by the said thread, but collapsing again after emerging from the threads, an inserter block of substantially prismatic oblong shape, provided with prick members, pivotally mounted near opposite sides of the inserter block, each fixed member including two pricks with flat parallel faces and parallel triangular tooth shaped ends, said pricks being joined by a transverse skirt member projecting outwardly from said inserter block and at an angle thereto, said skirt members being seized and held by a surgical forceps for locating the inserter block on an exactly defined spot of the vasiform organ, the pricks holding the latter in a flattened distended condition.

9. A surgical instrument as claimed in claim 8, wherein the prick members are mounted in recessed end portions of the inserter block leaving a projecting portion between them, adapted to be gripped without moving the pricks.

GEORGE O. A. KELLOGG.

No references cited.